(12) United States Patent
Gevers et al.

(10) Patent No.: US 7,818,996 B2
(45) Date of Patent: Oct. 26, 2010

(54) HIGH THROUGHPUT SCREENING FOR RAPID DEVELOPMENT OF MEMBRANES AND MEMBRANE PROCESSES

(75) Inventors: Lieven Gevers, Mechelen (BE); Pieter Vandezande, Wezemaal (BE); Johan Paul, Dilbeek (BE); Ivo Vankelecom, Ternat (BE); Pierre Jacobs, Gooik (BE)

(73) Assignee: K.U. Leuven Research and Development, Leuven (BE)

(*) Notice: Subject to any disclaimer, the term of this patent is extended or adjusted under 35 U.S.C. 154(b) by 418 days.

(21) Appl. No.: 11/631,607

(22) PCT Filed: Jul. 6, 2005

(86) PCT No.: PCT/BE2005/000110

§ 371 (c)(1),
(2), (4) Date: Jan. 5, 2007

(87) PCT Pub. No.: WO2006/002500

PCT Pub. Date: Jan. 12, 2006

(65) Prior Publication Data

US 2008/0028834 A1 Feb. 7, 2008

(30) Foreign Application Priority Data

Jul. 6, 2004 (GB) ............................ 0415145.2
Sep. 24, 2004 (GB) ............................ 0421283.3

(51) Int. Cl.
*G01N 15/08* (2006.01)
(52) U.S. Cl. .................................................. 73/38
(58) Field of Classification Search ............... 73/38; 702/114; 210/232
See application file for complete search history.

(56) References Cited

U.S. PATENT DOCUMENTS

| 4,032,633 | A | * | 6/1977 | Gregory et al. | ............. 514/12 |
| 4,790,942 | A | * | 12/1988 | Shmidt et al. | ............ 210/650 |
| 4,846,970 | A | * | 7/1989 | Bertelsen et al. | ......... 210/232 |
| 5,490,415 | A | * | 2/1996 | Mak et al. | ............ 73/64.47 |
| 5,914,154 | A | * | 6/1999 | Nemser | .............. 427/245 |
| 6,224,763 | B1 | * | 5/2001 | Feng et al. | ............ 210/232 |
| 6,228,271 | B1 | | 5/2001 | Cote | |
| 2003/0033106 | A1 | * | 2/2003 | Von Der Hardt et al. | .... 702/114 |

FOREIGN PATENT DOCUMENTS

JP  05 157680  6/1993
JP  2002 045661  2/2002

\* cited by examiner

*Primary Examiner*—Hezron Williams
*Assistant Examiner*—Alex Devito
(74) *Attorney, Agent, or Firm*—Bacon & Thomas, PLLC

(57) ABSTRACT

The present invention provides a testing system allowing the simultaneous comparative evaluation of the behavior in a membrane process of two or more selected membranes (4). In a preferred embodiment said system allows the control of the hydrodynamics of the feeding liquid by means of stirrers (13).

22 Claims, 7 Drawing Sheets

Bottom Plate

HIGH THROUGHPUT SCREENING FOR RAPID DEVELOPMENT OF MEMBRANES AND MEMBRANE PROCESSES

FIELD OF THE INVENTION

The present invention relates to a testing system allowing the simultaneous comparative evaluation of the behaviour of at least two selected membranes in a membrane filtration process.

BACKGROUND OF THE INVENTION

Membrane technology is an emerging field with annual growth rates of more than 10% (Nunes and Peinemann, 2001). It covers a wide variety of techniques. In dialysis and electrodialysis, separations take place under influence of a gradient in concentration or in electrical potential respectively. Pervaporation typically involves the phase transition of a liquid into a vapour during the passage through the membrane. The driving force of this partial pressure driven separation is maintained by the presence of a sweep gas or a vacuum at the permeate side. Pressure driven operations comprise microfiltration (MF), ultrafiltration (UF), nanofiltration (NF), reverse osmosis (RO) and gas separation. Pressures in gas separation can rise up to 100 bar. When liquids are used in the feed, the nomenclature is defined rather arbitrarily. In general, MF is referring to processes running at pressures between 0.1 and 2 bar, UF between 1 and 5 bar, NF between 5 and 20 bar, RO between 10 and 100 bar. NF and RO are sometimes referred to as hyperfiltration as well (Mulder, 2003). An enormous variety of membranes can be applied in these processes, ranging from very dense to highly porous structures, with either an organic, inorganic or organo-mineral composition. Moreover, the selective top-layer can be combined with a variety of support layers to form optimized composite structures. Only for the fields of NF and RO, more than 250 patents and literature references can be found already before 1993 as reviewed by Petersen (1993) and still more than 100 to date (Vankelecom, De Smet, Gevers, Jacobs, 2004).

In order to select the most appropriate membrane for a given separation problem, many industrially available membranes need to be screened, which is often a time consuming and both labor and energy intensive process. Common lab-scale membrane screening takes place with either cylindrically shaped membranes (hollow fibres, capillary and tubular membranes) or membrane coupons cut from flat sheet membranes. They have to be sealed in the testing device, the feed has to be loaded and permeation has to run for several minutes, hours or even days, depending on the specific feed/membrane combinations. Moreover, since many different process parameters influence the membrane behavior, this testing should optimally be performed under a wide range of conditions for a given feed/membrane combination. Temperature, pH, type and concentration of solute, pressure, solvent choice, stirring speed, . . . are some examples of important parameters that define such conditions.

Being an emerging technology, an optimal membrane is not yet available for each specific separation problem, thus leaving an important incentive for the development of new membranes. Membrane synthesis typically takes place in a multi-parameter space, leaving again a whole set of prepared membrane to be tested. Phase inversion is a typical way to prepare membranes for pressure driven applications. It involves the transformation of a polymer solution into a solid polymer membrane, typically by immersing the polymer solution in a non-solvent bath. In this process, every parameter change can induce a significant change in membrane performance: organic or inorganic additives can be mixed in the polymer solution and the coagulation bath, different solvents can be selected, evaporation conditions can be varied (forced flow, gas atmosphere), casting temperature can be changes, . . . . Another typical synthesis process involves dip coating in which a support layer is dipped into a polymer solution that will form the actual separating top-layer. Polymer concentration, casting solvent, support pre-treatment, . . . are some of the main parameters involved in this process.

It is clear that membrane technology would benefit enormously from the possibility to perform the screening of membranes in a more efficient way than this sample by sample lab-scale testing.

The present invention provides a system allowing the high throughput screening of the performance of selected membranes for a given purpose. This system comprises multiple individual units and each unit comprises all features, which are typically present in a full-scale operational membrane filtration unit. In consequence, the data derived from the screening using the system of the present invention can be extrapolated to predict the behaviour of a given membrane in a full-scale system.

SUMMARY OF THE INVENTION

One aspect of the present invention relates to a membrane testing system allowing the simultaneous comparative evaluation of the behaviour of two or more selected membranes in a membrane filtration process, said system comprising a plurality of membrane testing cells and each testing cell comprising a stirring device, a fluid inlet, a permeate outlet and a retentate outlet as well as means to drive the filtration process.

In a particular embodiment of the invention, each testing cell of the testing system further comprises a gas outlet which allows the evacuation of the gasses during the filling of the cells with the feed solution.

In another particular embodiment, the membrane filtration process is driven by pressure. In a yet more particular embodiment, said pressure can be applied by using an inert gas and whereby in a particular embodiment, the pressure is applied by pumping the feed solution into the cell.

In another particular embodiment, the membrane filtration process is driven by pervaporation, whereby said pervaporation force can be provided by using vacuum (or via a vacuum connection) or by using a sweep gas.

Another particular embodiment of the invention relates to a membrane testing system which furthermore comprises
  i. a central unit comprising a plurality of cavities, each cavity comprising its stirring device; and
  ii. a bottom plate, which can be reversibly fixed to the central unit and comprises membrane positioning sites.

In another embodiment, the testing cells of the testing system are fed with a feed solution from one reservoir through one fluid inlet in the central unit.

Another aspect of the present invention relates to the use of a membrane testing system comprising a plurality of membrane testing cells and each testing cell comprising a stirring device, a fluid inlet, a permeate outlet and a retentate outlet as well as means to drive the filtration process, for the simultaneous comparative evaluation of the behaviour of two or more membranes in a membrane filtration process.

Another aspect of the present invention relates to a method for simultaneous comparative evaluation of the behaviour of two or more selected membranes in a membrane filtration process, said method comprising the use of a membrane testing system comprising a plurality of membrane testing cells and each testing cell comprising a stirring device, a fluid inlet, a permeate outlet and a retentate outlet as well as means to drive the filtration process. In a particular embodiment, said method further comprises the use of a fraction collector to collect permeates from the testing cells of the membrane testing system.

DETAILED DESCRIPTION OF THE INVENTION

Legend to the Figures

DESCRIPTION

Filtration through membranes is a very important technique used in many different fields and a variety of filtration techniques through membranes exist. Pervaporation typically involves the phase transition of a liquid into a vapour during the passage through the membrane. The driving force of this partial pressure driven separation is maintained by the presence of a sweep gas or a vacuum at the permeate side. Pressure driven operations comprise microfiltration (MF), ultrafiltration (UF), nanofiltration (NF), reverse osmosis (RO) and gas separation. Pressures in gas separation can rise up to 100 bar. When liquids are used in the feed, the nomenclature is defined rather arbitrarily. In general, MF is referring to processes running at pressures between 0.1 and 2 bar, UF between 1 and 5 bar, NF between 5 and 20 bar, RO between 10 and 100 bar. NF and RO are sometimes referred to as hyperfiltration as well.

In a first object the present invention provides an easy to use testing system allowing the simultaneous comparative evaluation of the behaviour of two or more selected membranes. Said system comprises a plurality of individual membrane testing cells, each cell comprising all features, which are typically present in a full-scale operational membrane filtration unit. The testing system comprises at least two individual membrane testing cells and comprises in a particular embodiment between 5 and 20 or between 10 and 20 or more testing cells and could comprise at least 5 or 10 or 15 or 20 testing cells. The testing cells can be of any form as long as suited for testing membranes and can for example be cuboid or cylindrical. The testing cells are in a preferred embodiment cylindrical.

In a preferred embodiment the testing system is constructed so that it minimizes the required membrane sample areas and feed volumes. Typical feed volumes in a dead-end module for flat sheets should range between 2.5 ml and 250 ml per cell with an active membrane area between 0.5 $cm^2$ and 50 $cm^2$. Once the feed volume is defined, inserts can be applied to adapt the feed volume and/or active membrane area. The former can be obtained by inserting hollow cylinders with an outer diameter that fits the original feed volume exactly. Modification of the active membrane area can be obtained by placing discs on top of the membrane coupon with an outer diameter matching the original feed cylinder diameter and an inner diameter that defines the required active membrane area.

The plurality of membranes that can be tested simultaneously can all have the same composition or can have different compositions. In the case of separate feeding of each individual testing cell through individual reservoirs, it is possible to test one type of membrane simultaneously with multiple different feeding solutions and adaptable feed volumes. In a more preferred embodiment the system also provides the possibility to simultaneously test membranes having different compositions with different feeds and adaptable feed volumes.

In another preferred embodiment the system is designed such that it allows an easy positioning and removal of the membranes.

Furthermore, the system of the present invention comprises means to control the hydrodynamic conditions in the feed (stirring or pumping speed, pressure, feed volume, . . . ). Moreover, the arrangement of a plurality of membrane testing cells in a single system allows a good maintenance of the uniformity of said hydrodynamic conditions over the different membrane testing cells. An important element in the control of the hydrodynamic conditions in the feed of a membrane process is the stirring means and the control thereof. Preferably, the stirrer should be positioned as close as possible to the membrane surface, while still eliminating the risk of membrane damage. In the stirring systems of the present invention, the stirring height is preferably about 0.5 cm above the membrane, ranging from 0.1 cm to 2 cm, and subsequently could for example also be 0.2 cm, 0.3 cm, 0.4 cm, 0.6 cm, 0.7 cm, 0.8 cm, 0.9 cm or 1 cm. The stirrers of each testing cell either can be driven by motor-less magnetic stirring devices or by a central engine that is connected to each stirrer via toothed wheels or propulsion belts. Different systems according to the present invention can be designed depending on the preferred driving force for the membrane filtration process. The membrane filtration can either be affected in dead-end, where a pressure is applied by means of an inert gas, or in cross-flow, where pumps circulate the feeds at the required pressures. Also a pervaporation process can be applied by using vacuum or a sweep gas in the testing system.

In another preferred embodiment the system of the present invention allows the automatic collection of the permeates of the different tested membranes as a function of time to allow a minimum study of compaction and to discard initial, non-equilibrium samples.

Below different particular embodiments of the invention are presented. The systems presented in these embodiments have in common that they comprise:
  i. a central unit comprising a plurality of cavities, each cavity comprising its stirring device;
  ii. a bottom plate, which can be reversibly fixed to the central unit and comprises membrane positioning sites.

Upon fixing the bottom plate to the central unit, the cavities connect to the respective membrane positioning sites to form membrane testing cells. Each such membrane testing cell comprises at least a fluid inlet, a permeate outlet, a retentate outlet and a stirring device.

The bottom plate is movable, in a particular embodiment vertically movable, from a position wherein the membrane positioning sites of the bottom plate are connected to the cavities of the central unit, to a position wherein there is no connection between said cavities and said membrane positioning sites in order to allow the deposition or removal of the membranes.

Figure 1:
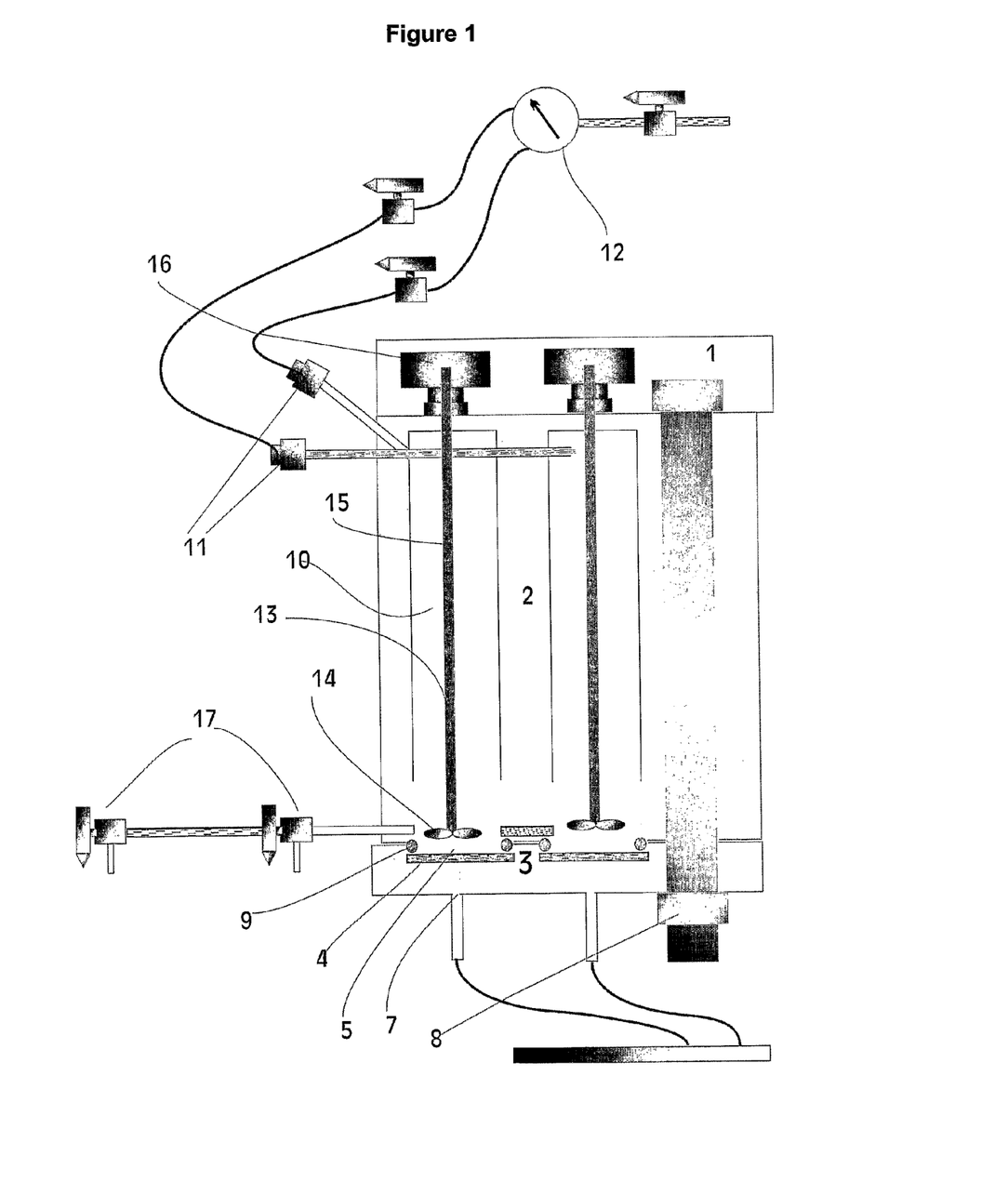
FIG. 1: Schematic overview of a particular HT-module according to the present invention.
Figure 2:
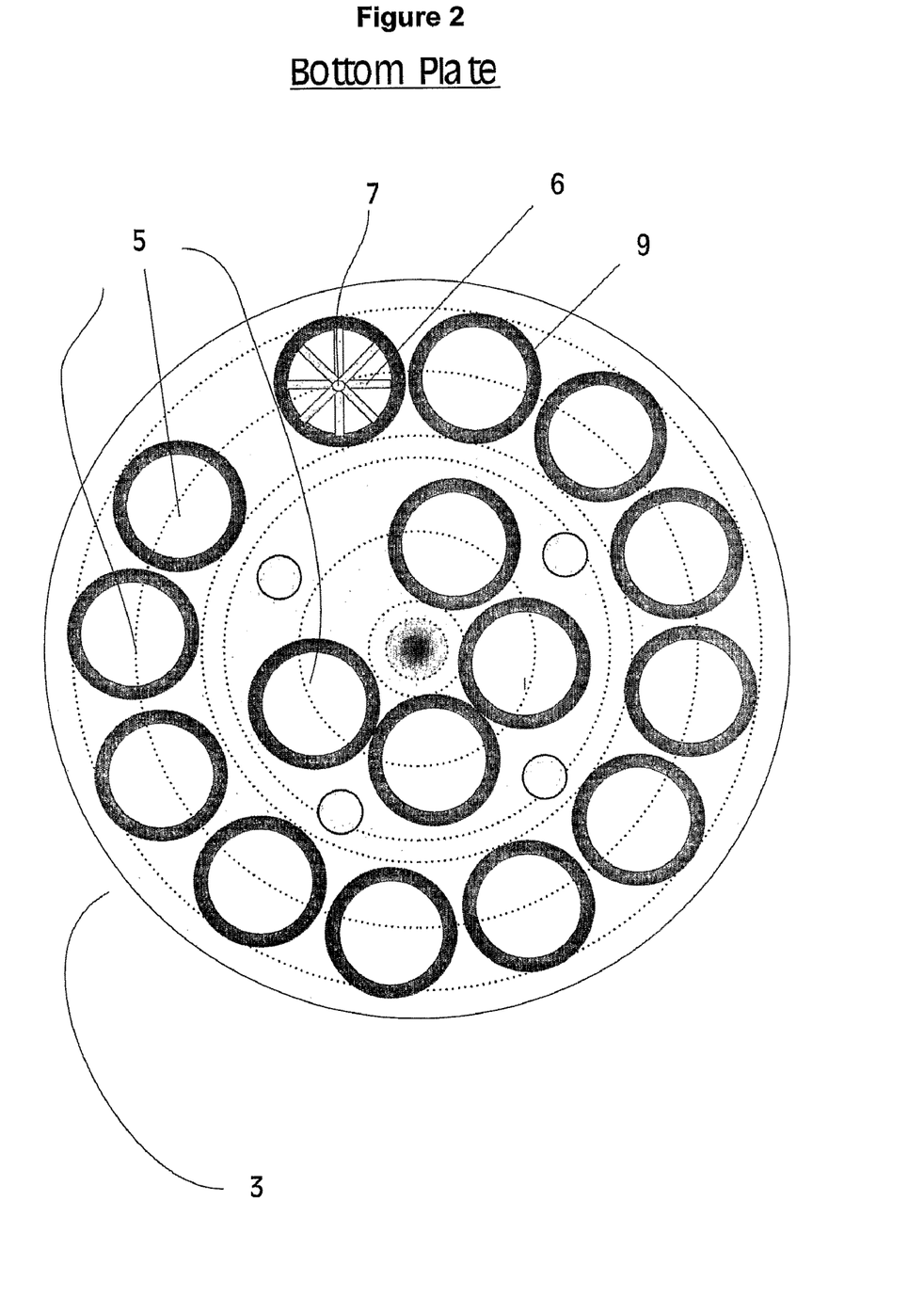
FIG. 2: Schematic presentation of the bottom plate of the HT-module.

A particular embodiment of the high-throughput system of the present invention is described below and is illustrated in FIGS. 1 and 2.

The HT-system comprises 3 main parts: a top plate (1), which is fixed on a central unit (2) to which a bottom plate (3) can be mounted. In this particular example the bottom plate has 16 membrane positioning sites and thus can comprise 16 membranes (4). Typically, each membrane (4) is deposed on a removable plate of sintered INOX, which is positioned in a membrane positioning site which is a circular saving (5) in the bottom plate. Grooves (6) in the bottom of said saving (5) promote the draining of the filtrate towards the permeate outlet (7) in the centre of the saving. Preferably, the permeate outlets are connected to a fraction collector.

To allow the positioning of the membranes in the bottom plate (3), said bottom plate can be detached from the central unit (2). In this particular example this is done by unscrewing a central marsh (8) below the bottom plate. After positioning the membranes, an o-ring (9) is deposed on each membrane to assure a leak-tight fit when the bottom plate (3) is mounted to the central unit (2). The savings (5) in the bottom plate (3) connect to cylindrical cavities (10) in the central unit (2). Feeding liquids can be pumped into each cylindrical cavity (10) via the fluid inlet (11). Each cylindrical cavity having its own fluid inlet. After introducing the fluid in a given cylindrical cavity, the pressure in said cavity, and in consequence on the liquid above the membrane, is adjusted by connecting the fluid inlet (11) to a pressure source (12).

During the filtration procedure the feeding liquids are continuously stirred. The stirrers (13) comprise a stirring element (14), which is mounted close to the membrane, and a stalk (15), which connects to a toothed wheel (16) in the top plate (1). Said toothed wheel (16) being connected to a central motor allowing a uniform stirring speed for all stirrers.

Upon termination of the filtration the remaining fluid above the membrane can be evacuated by opening the valves of the retentate outlet (17). After evacuation of the remaining fluid the bottom plate can be lowered to remove the membranes and, if required, to clean the system.

In a preferred embodiment the system further comprises one or more heating elements allowing to control the operation temperature.

Figure 3:
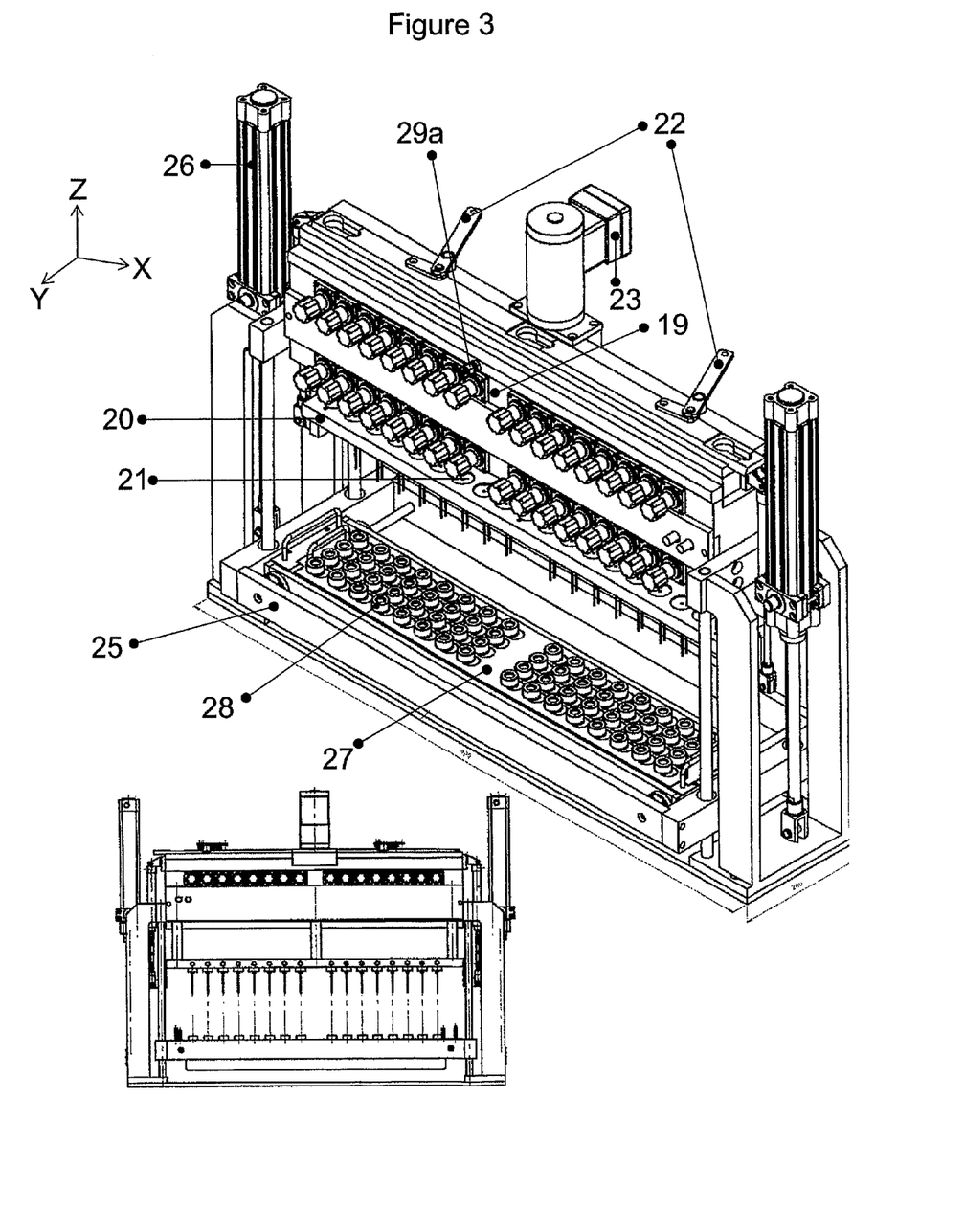
FIG. 3: Front view of a HT-module comprising a series of in-line positioned membrane testing cells
Figure 4:
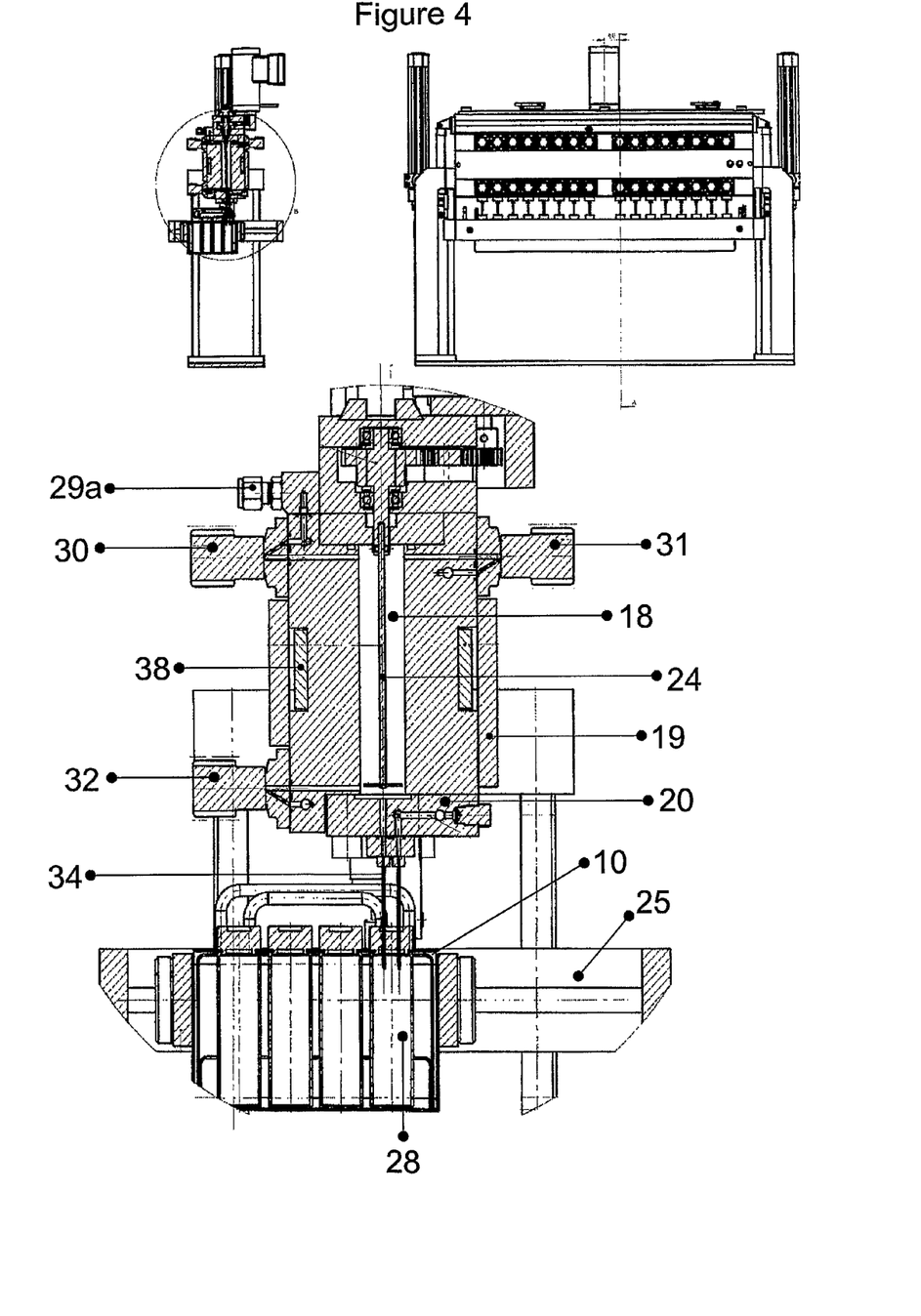
FIG. 4: Section of a HT-module comprising a series of in-line positioned membrane testing cells

FIGS. 3 & 4 illustrate another embodiment of the present invention. Said system comprises a plurality of cylindrical cavities (18) arranged in line within the central unit (19). Each said cavity connects with a membrane positioning site (21) in the bottom plate (20) upon locking said bottom plate to the central unit, preferably using locks (22). Said bottom plate can be detached from the central unit to be lowered in order to position or remove the membranes. Preferably the bottom plate is actuated up and down using a pneumatic cylinder. The system further comprises a central motor (23) driving the stirring systems (24) comprised in each cavity. The system also comprises a fraction collector (25), which can be moved in the z and y directions. Preferably, the vertical movement of the fraction collector is generated by pneumatic cylinders (26). Said fraction collector further comprises one or more racks (27) comprising several rows of collection vials (28). Preferably, the number of collection vials in each row corresponds to the number of membrane testing cells. In a particular embodiment, the collection vials are cooled for example by immersing them in a cooling liquid or ice. Each membrane testing cell being formed by a said cylindrical cavity in the central unit being connected to a membrane positioning site in the bottom plate. The system further can comprise one or more heating elements (38) (i.e. electrical resistors) allowing to control the operation temperature. In a particular embodiment, the testing system is heated up to temperatures between 50° C. and 100° C. or higher.

The system of this particular embodiment can either comprise pressure driven (FIG. 5) or pervaporation driven cells (FIG. 6) as described below. Both types of cells are fed with a feed solution from a reservoir (29). Preferably said reservoir is mounted above the cells. This reservoir can either be a single reservoir feeding all cells through a central feed solution inlet (29*a*) or comprise a plurality of individual reservoirs feeding either individual cells or groups of selected cells. In case the reservoir is mounted above the cell the feed solution is transferred to the cell using gravity by opening the valve (30) of fluid inlet. The air or other gasses are evacuated from the cell to the atmosphere during the in-flow of the feed solution valves by opening the valve (31) of the gas evacuation system. For instance at the end of the experiment, the fluid in the cells can be evacuated and collected by opening the valve of the retentate outlet (32). In a particular embodiment the fluid exit is connected to a circulation pump (33), which returns the feed solution to the reservoir (29). This embodiment is particularly useful for carrying out long term experiments during which the feed solution can be added to the reservoir in accordance to the loss of volume due to filtration.

Figure 5:
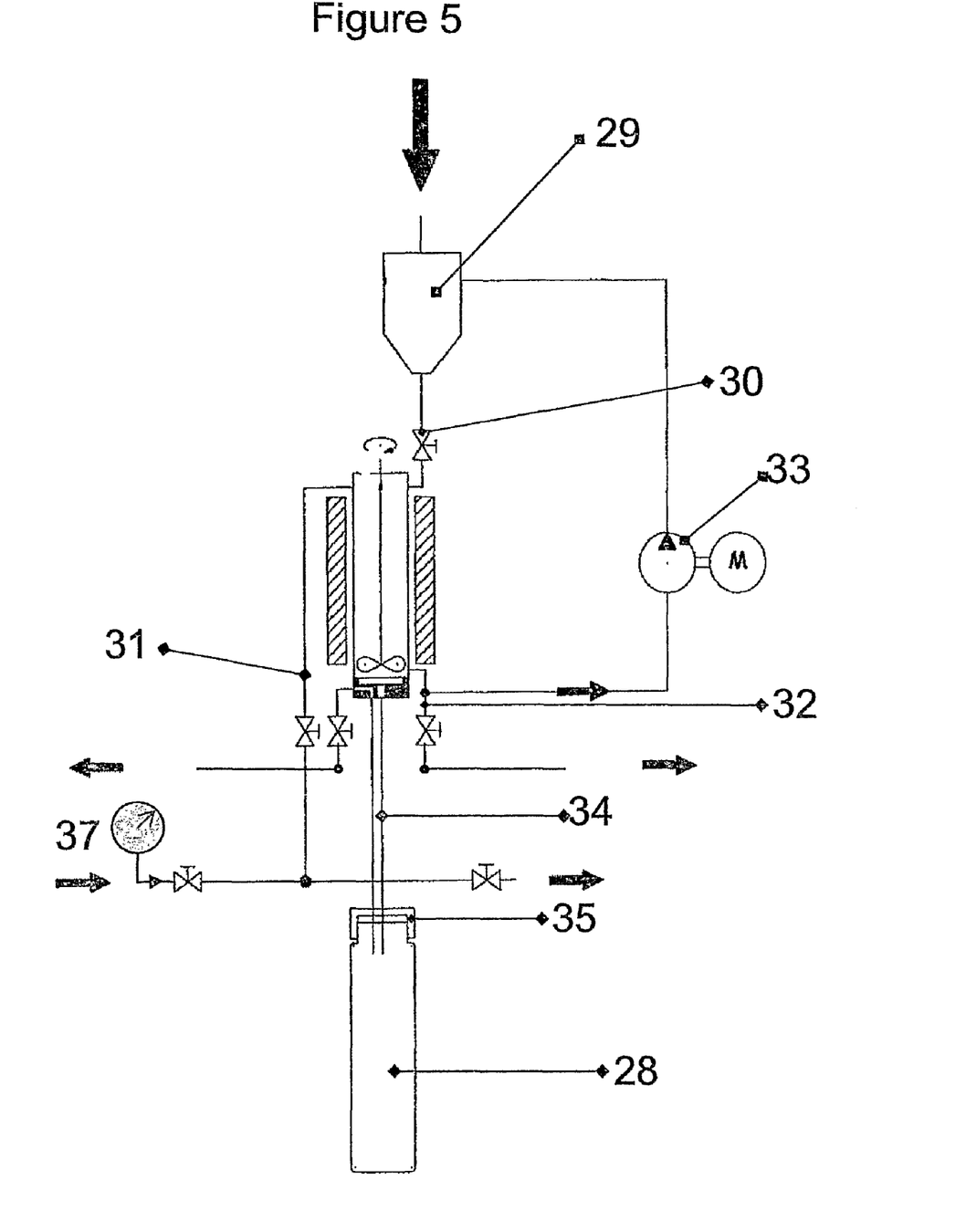
FIG. 5: Schematic presentation of a pressure driven membrane testing cell
Figure 6:
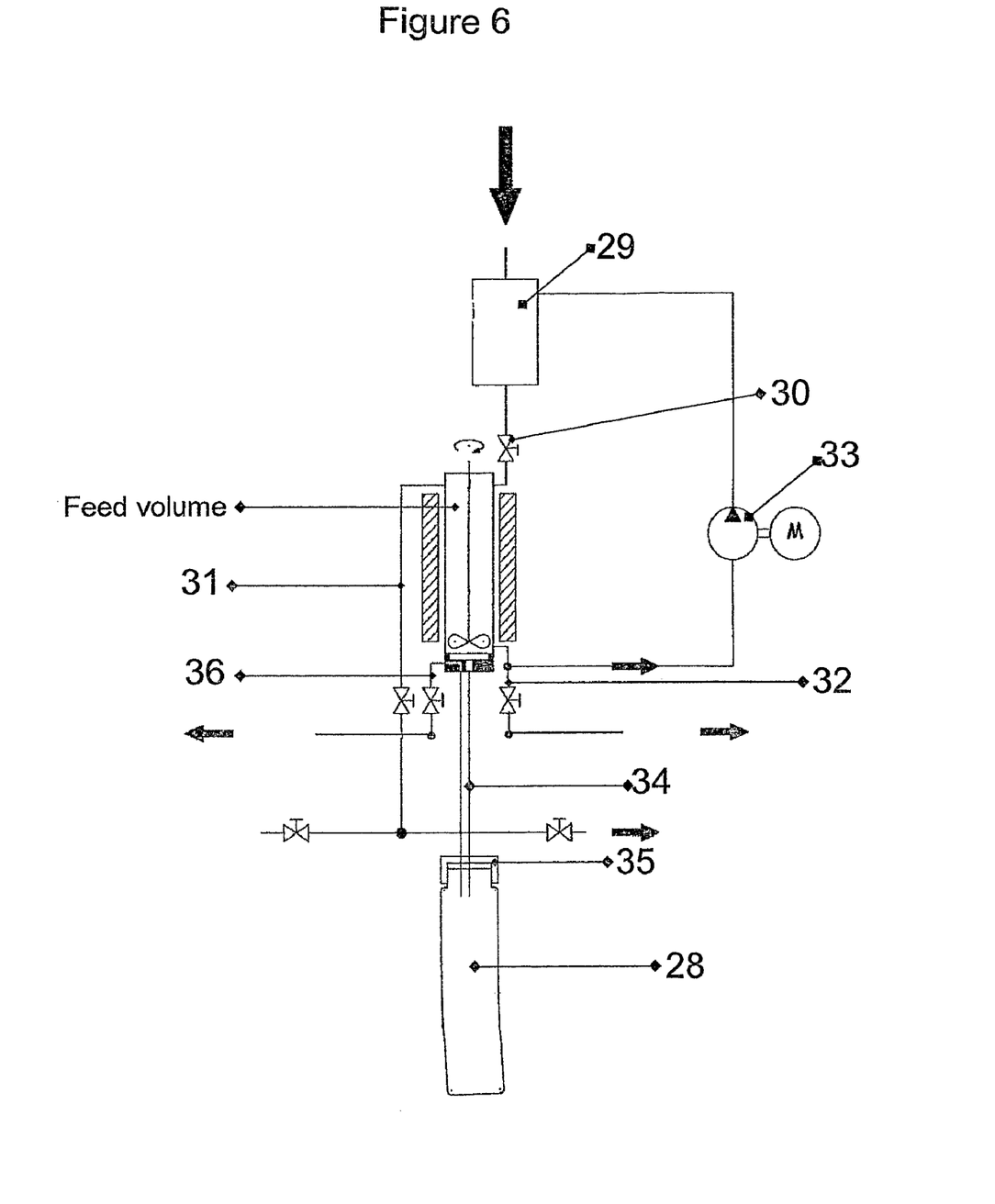
FIG. 6: Schematic presentation of a pervaporation driven membrane testing cell FIG. 7. Sheet of laboratory-prepared polyimide membrane with the samples cut.

The permeate flows via the permeate outlet (34) into the collection vial (28). Preferably, the permeate exit (34) is a rigid structure able to penetrate the septum (35) capping the collection vial (28), when the fraction collector (25) is moved up towards the bottom plate (20). After given time intervals the fraction collector is lowered and is moved in the y direction in order to position a new row of collection vials under the membrane testing cells. Thereafter, the fraction collector is brought up again in order to collect a new set of samples.

As indicated above the filtration is either pressure (FIG. 5) or pervaporation driven (FIG. 6). In the pervaporation cells the pervaporation force is applied via a vacuum connection (36) at the permeate side of the cell or by using a sweep gas. In the testing systems using a pressure driven filtration (i.e. for nanofiltration cells), the pressure driving the filtration is applied by connecting the testing cells to a pressure source (37). Preferably, the cell is connected to the pressure source (37) via the gas evacuation system (31).

Example 1

Description and Use of a High-Throughput Screening System According to the Present Invention 1. Materials and Methods 1.1 Membranes MPF-50 membranes were obtained from Koch Membrane Systems (Wilmington, Mass., USA). The laboratory-made polyimide (PI) membranes were synthesized via a phase inversion procedure. A 20 wt % PI (Matrimid 9725®, kindly supplied by Huntsman, Switzerland) solution, prepared with NMP (Aldrich) as solvent and THF (Acros) as co-solvent (NMP:THF=3:1 volume ratio), was cast on a polyester support (Viledon Non-woven FO2471, kindly supplied by Freudenberg, Germany). The solvent was allowed to evaporate during 1 min, after which the film (250 μm) was immersed in de-ionised water at room temperature. The membrane was post-treated by solvent-exchange: 3 h in 2-propanol (ChemLab), followed by 3 days in a (toluene (Vel)/2-methyl-4-pentanone (Acros)/mineral oil (P3, Pfeiffer)) bath with a 40/40/20 volume ratio. The membrane was finally dried during 1 h at 65° C. under vacuum.

1.2. Experimental Set-Ups

1.2.1. HT-Testing

HT-screening tests were performed on a laboratory-made HT-filtration module that was especially designed to allow 16 simultaneous filtrations in separately stirred cells at controlled temperature and pressures up to 60 bars. A 70 µM rose bengal (RB, 1017 g/mol, Fluka) solution in 2-propanol (ChemLab) at room temperature was selected as a typical SRNF-feed. All cells being interconnected, an identical 10 bar nitrogen pressure could be applied. Feeds (0.025 l) were stirred mechanically and permeate samples were collected in cooled flasks as a function of time.

1.2.2. Conventional Dead-End Filtration

Dead-end filtrations were conducted in a standard stainless steel cell, with an active filtration surface of $12.6 \times 10^{-4}$ m$^2$ and a feed chamber volume of 70 ml. Membrane discs were supported by a porous stainless steel disc and sealed with Viton O-rings. For the MPF-50 and the PI membrane respectively, 0.025 and 0.075 l of the 70 µM RB-solution was brought in the cell. This was pressurized with nitrogen gas to 10 bar at room temperature. The feed was stirred magnetically with a Teflon-coated magnetic bar, suspended 3 mm above the membrane. Permeate samples were collected in cooled flasks as a function of time.

1.2.3. Analysis

The permeability is expressed in $l \cdot m^{-2} \cdot h^{-1} \cdot bar^{-1}$, while rejection is defined as R (%)=$100 \cdot (1-C_p/C_f) \cdot C_p$, the dye concentration in the permeates, is analysed while $C_f$ represents the initial dye concentration in the feed. UV-Vis measurements were recorded on a Perkin-Elmer lambda 12 UV-Vis spectrophotometer at 548 nm.

2. Results And Discussion

2.1 Description and Operation of the HT-Module

In order to possess sufficient flexibility, the HT-module comprised following aspects:

- Miniaturisation to minimize the required membrane sample area and feed volume, and to ensure the practical handling of the HT-module;
- The possibility to simultaneously test membranes from different composition (by preference to be cut from common flat-sheets without any special sealings) with different feeds and adaptable feed volumes;
- In spite of the miniaturization, a minimum control over the hydrodynamic conditions in the feed should be possible (stirring speed, pressure, feed volume, . . . );
- Permeates of all different membranes should be collected automatically as a function of time to allow a minimum study of compaction and to discard initial, non-equilibrium samples;
- The module should allow fast loading/unloading of all membrane samples and feed/retentate solutions;

Such module as schematically represented in FIGS. 1 and 2, was constructed from a massive stainless steel cylinder of 0.17 m diameter. Sixteen individual cells were drilled out with a diameter of 0.03 m and a height of 0.12 m. Each cell is equipped with a stainless steel stirrer. All stirrers are driven by a central engine with a 0-2000 rpm speed regulator.

At the start of the experiment, 16 membrane discs, each with an active filtration area of $4.52 \times 10^{-4}$ m$^2$, are placed on the porous stainless steel discs and sealed with Viton O-rings. The cells are filled individually using a pressurized vessel, connected to a low-pressure regulator and pressure gauge. The feed solution is poured through the funnel into the pressurized vessel, which is subsequently connected to the fluid inlet (11) of a cell via a Teflon pressure tube and a 'quick connect' (Swagelok®, H). After filling, all cells are finally pressurized simultaneously. Permeate samples are collected in cooled flasks as a function of time with a programmable fraction collector, while retentate samples could be collected by opening the fluid draining pipes.

2.2 Reproducibility Tests

Figure 7:
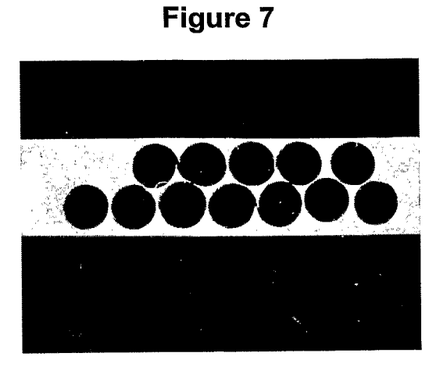

The reproducibility of permeability and retention data with the HT-module was verified by testing several membrane samples originating from one single sheet of a laboratory-prepared PI membrane, shown in FIG. 7. Since the dimensions of the casting machine only allowed 12 samples to be cut, 4 cells remained unoccupied in the module.

Table 1 provides a statistical summary of the measurements. For each permeate fraction the mean, the maximum and the minimum values, as well as standard deviation and ratio of the standard deviation to the mean (as a percentage) are given. The reproducibility of the tests with the PI membranes is excellent with standard deviations on permeability of around 10% and on rejection of less then 2%. This is in line with catalysis results and is even highly encouraging given the generally known inherent variability on membrane coupons from a certain membrane sheet, even if prepared industrially. The PI membrane was also tested with a conventional dead-end filtration cell. Permeabilities of 1.002; 0.927 and 0.884 $l \cdot m^{-2} \cdot h^{-1} \cdot bar^{-1}$ and rejections of 98.63; 98.13 and 97.88% after 1, 2 and 3 hours filtration respectively, were found. This is in line with the data obtained with the HT-module.

Figure 8:
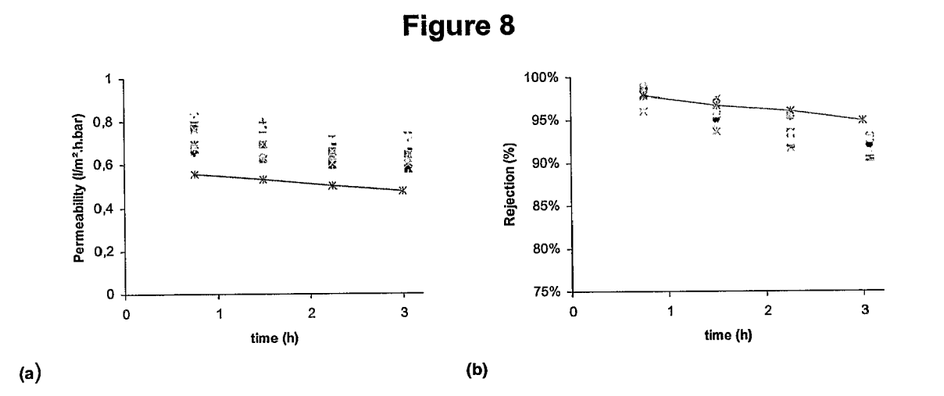
FIG. 8. MPF-50 permeability (a) and rejection (b) data (16 measurements), obtained with the HT-module. Full line: data obtained with conventional dead-end module.

MPF-50 was the commercial membrane of choice to further investigate the module reliability. Sixteen pieces could be cut now from one sheet and FIGS. 8a and b, as well as Table 2a show a similar data reproducibility.

For comparison, the inherent error on conventional dead-end filtrations was also studied by testing 6 MPF-50 coupons consecutively with the same feed. Table 2 shows that the statistical deviations on the conventional dead-end filtration data are in line with those obtained with the HT-module. In spite of the much smaller scale, the good reproducibility of the results obtained with the HT-module can be understood, considering the identical conditions of pressure, temperature and stirring speed in the parallel measurements. The mean values from the dead-end filtrations are also shown in FIG. 8 as line-connected data. For both membrane types, rejections clearly fall in the same range, irrespective of the set-up. A slight, but systematically lower permeability is obtained in the larger module, especially for MPF-50. The exact reason is unclear for the moment, but could possibly be due to the different stirring.

3. Conclusion

The developed HT-module results in a substantial experimental time gain by allowing the simultaneous testing of 16 different membranes, commercial as well as laboratory-prepared, at strongly shortened loading and unloading times. Different feed solutions can be used per membrane, all module components are solvent resistant and high pressures can be applied, thus making it possible to screen the whole spectrum of pressure-driven membrane processes.

The high accuracy of the obtained results proves that it is reasonable to consider HT-methods to rapidly screen a large number of parameters in the development of high-performing membranes and their applications. The results clearly demonstrate the potential of the developed equipment and of HT-screening methods in general as a powerful tool for membrane processes.

TABLE 1

Statistical analysis of permeability and rejection data of the PI membrane, obtained with the HT-module.

| | Permeability ($l/m^2 \cdot h \cdot bar$) | | | Rejection (%) | | |
|---|---|---|---|---|---|---|
| Time (h) | 1 | 2 | 3 | 1 | 2 | 3 |
| Average | 1.24 | 1.03 | 0.92 | 97.5 | 96.4 | 95.7 |
| Max. | 1.39 | 1.24 | 1.08 | 99.4 | 99.2 | 99.0 |
| Min. | 1.11 | 0.89 | 0.79 | 94.5 | 94.5 | 93.7 |
| Standard deviation | 0.102 | 0.118 | 0.115 | 1.65 | 1.91 | 1.46 |
| Percent standard deviation (%) | 8.25 | 11.49 | 12.50 | 1.69 | 1.99 | 1.52 |

TABLE 2

Statistical analysis of MPF-50 permeability and rejection data, obtained with the HT-module (a) and a standard lab-scale nanofiltration cell (b).

| | | Permeability ($l/m^2 \cdot h \cdot bar$) | | | | Rejection (%) | | | |
|---|---|---|---|---|---|---|---|---|---|
| | Time (h) | 0.75 | 1.5 | 2.25 | 3 | 0.75 | 1.5 | 2.25 | 3 |
| (a) | Average | 0.72 | 0.66 | 0.63 | 0.62 | 98.1 | 95.6 | 93.5 | 91.6 |
| | Max. | 0.84 | 0.80 | 0.75 | 0.74 | 99.1 | 97.4 | 95.5 | 93.1 |
| | Min. | 0.59 | 0.55 | 0.54 | 0.51 | 96.1 | 93.6 | 91.1 | 89.2 |
| | Standard deviation | 0.084 | 0.078 | 0.069 | 0.071 | 0.91 | 1.11 | 1.50 | 1.38 |
| | Percent standard deviation (%) | 11.64 | 11.79 | 10.91 | 11.57 | 0.93 | 1.16 | 1.61 | 1.50 |
| (b) | Average | 0.56 | 0.53 | 0.50 | 0.48 | 97.8 | 96.7 | 96.1 | 94.8 |
| | Max. | 0.66 | 0.61 | 0.58 | 0.58 | 99.5 | 98.4 | 97.7 | 96.7 |
| | Min. | 0.44 | 0.45 | 0.42 | 0.39 | 97.1 | 95.7 | 94.2 | 93.3 |
| | Standard deviation | 0.090 | 0.063 | 0.060 | 0.071 | 0.66 | 1.11 | 1.70 | 1.54 |
| | Percent standard deviation (%) | 16.13 | 11.81 | 12.02 | 14.93 | 0.68 | 1.15 | 1.77 | 1.62 |

The invention claimed is:

1. A membrane testing system comprising a membrane filtration process, driving means and a plurality of membrane testing cells, wherein each testing cell comprises a membrane, a feed side and a permeate side with respect to the membrane, said membrane having substantially planar surfaces on said feed side and said permeate side, a stirring device positioned on the feed side of the membrane, a fluid inlet, a permeate outlet and a retentate outlet, wherein said membrane testing system thereby enables the simultaneous comparative evaluation of the behaviour of two or more selected membranes in a membrane filtration process by driving a fluid through the two or more selected membranes substantially perpendicularly to the surface of the respective membrane on said feed side.

2. The membrane testing system according to claim 1, wherein each testing cell further comprises a gas outlet which enables evacuation of gasses during filling of the cells with a feed solution.

3. The membrane testing system according to claim 1, wherein the membrane filtration process is driven by pressure.

4. The membrane testing system according to claim 3, wherein the pressure is applied using an inert gas.

5. The membrane testing system according to claim 3, wherein the pressure is applied by pumping a feed solution into the cell.

6. The membrane testing system according to claim 1, wherein the membrane filtration process is driven by a pervaporation force.

7. The membrane testing system according to claim 6, wherein the pervaporation force is provided via a vacuum connection.

8. The membrane testing system according to claim 6, wherein the pervaporation force is provided using a sweep gas.

9. The membrane testing system according to claim 1, further comprising a central unit comprising a plurality of cavities, each cavity comprising a stirring device; and a bottom plate which can be reversibly fixed to the central unit and which comprises membrane positioning sites.

10. The membrane testing system according to claim 1, wherein the testing cells are fed with a feed solution from one reservoir through their fluid inlet.

11. A process for using a membrane testing system comprising a plurality of membrane testing cells, wherein each testing cell comprises a membrane, a feed side and a permeate side with respect to the membrane, said membrane having substantially planar surfaces on said feed side and said permeate side, a stirring device positioned on the feed side of the membrane, a fluid inlet, a permeate outlet and a retentate outlet as well as membrane filtration process driving means, wherein said process comprises the steps of:

feeding a fluid at the feed side of each of the plurality of membranes; and driving said fluid through each of the plurality of membranes with said driving means for simultaneous comparative evaluation of the behaviour of a plurality of membranes, wherein said driving of said fluid through each of the plurality of membranes is substantially perpendicularly to the surface of the respective membrane on said feed side.

12. A method comprising the use of a membrane testing system comprising a plurality of membrane testing cells, each testing cell comprising a membrane, a feed side and a permeate side with respect to the membrane, said membrane having substantially planar surfaces on said feed side and said permeate side, a stirring device positioned on the feed side of the membrane, a fluid inlet, a permeate outlet and a retentate outlet, wherein the method comprises the steps of:

feeding a fluid at the feed side of the two or more selected membranes;

driving said fluid through the two or more selected membranes; and automatic collection of the permeates of the two or more selected membranes as a function of time thereby enabling simultaneous comparative evaluation of the behaviour of two or more selected membranes in a membrane filtration process;

wherein said driving of said fluid through the two or more membranes selected membranes is substantially perpendicularly to the surface of the respective membrane on said feed side.

13. The method according to claim 12, further comprising the use of a fraction collector to collect permeates from the testing cells.

14. The method according to claim 12, wherein the driving of the fluid through the two or more selected membranes is done by pressure.

15. The method according to claim 14, wherein the pressure is applied using an inert gas.

16. The method according to claim 14, wherein the pressure is applied by pumping a feed solution into the cell.

17. The method according to claim 12, wherein the driving of the fluid through the two or more selected membranes is driven by a pervaporation force.

18. The method according to claim 17, wherein the pervaporation force is provided by vacuum.

19. The method according to claim 17, wherein the pervaporation force is provided using a sweep gas.

20. A membrane testing system comprising a dead-end membrane filtration process, driving means and a plurality of membrane testing cells, wherein each testing cell comprises a membrane, a feed side and a permeate side with respect to the membrane, said membrane having substantially planar surfaces on said feed side and said permeate side, a stirring device positioned on the feed side of the membrane, a fluid inlet, a permeate outlet and a retentate outlet, wherein said membrane testing system thereby enables the simultaneous comparative evaluation of the behaviour of two or more selected membranes in a dead-end membrane filtration process by driving a fluid through the two or more selected membranes substantially perpendicularly to the surface of the respective membrane on said feed side.

21. A process for using a membrane testing system comprising a plurality of membrane testing cells, wherein each testing cell comprises a membrane, a feed side and a permeate side with respect to the membrane, said membrane having substantially planar surfaces on said feed side and said permeate side, a stirring device positioned on the feed side of the membrane, a fluid inlet, a permeate outlet and a retentate outlet as well as dead-end membrane filtration process driving means, wherein said process comprises the steps of:

feeding a fluid at the feed side of each of the plurality of membranes; and driving said fluid through each of the plurality of membranes with said driving means for simultaneous comparative evaluation of the behaviour of a plurality of membranes, wherein said driving of said fluid through each of the plurality of membranes is substantially perpendicularly to the surface of the respective membrane on said feed side.

22. A method comprising the use of a membrane testing system comprising a plurality of membrane testing cells, each testing cell comprising a membrane, a feed side and a permeate side with respect to the membrane, said membrane having substantially planar surfaces on said feed side and said permeate side, a stirring device positioned on the feed side of the membrane, a fluid inlet, a permeate outlet and a retentate outlet, wherein the method comprises the steps of:

feeding a fluid at the feed side of the two or more selected membranes;

driving said fluid through the two or more selected membranes; and automatic collection of the permeates of the two or more selected membranes as a function of time thereby enabling simultaneous comparative evaluation of the behaviour of two or more selected membranes in a dead-end membrane filtration process, wherein said driving of said fluid through the two or more selected membranes is substantially perpendicularly to the surface of the respective membrane on said feed side.

* * * * *